United States Patent
Chaudhuri et al.

(10) Patent No.: US 9,942,812 B2
(45) Date of Patent: Apr. 10, 2018

(54) METHODS AND SYSTEMS FOR DYNAMIC COORDINATED MULTI POINT LINK MAINTENANCE

(71) Applicant: Wipro Limited, Bangalore (IN)

(72) Inventors: Saptarshi Chaudhuri, Bangalore (IN); Avijit Manna, Kolkata (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 108 days.

(21) Appl. No.: 15/049,185

(22) Filed: Feb. 22, 2016

(65) Prior Publication Data
US 2017/0188279 A1    Jun. 29, 2017

(30) Foreign Application Priority Data
Dec. 28, 2015 (IN) .......................... 7008/CHE/2015

(51) Int. Cl.
*H04W 36/00* (2009.01)
*H04W 36/08* (2009.01)
(Continued)

(52) U.S. Cl.
CPC ............ *H04W 36/08* (2013.01); *H04B 7/024* (2013.01); *H04L 5/0035* (2013.01); *H04W 24/04* (2013.01);
(Continued)

(58) Field of Classification Search
CPC ...... H04B 7/024; H04W 24/04; H04W 24/08; H04W 36/08; H04W 36/26; H04W 36/30; H04W 36/003
See application file for complete search history.

(56) References Cited

U.S. PATENT DOCUMENTS

2003/0186678 A1* 10/2003 Lucidarme .............. H04W 4/24
455/406
2011/0075611 A1 3/2011 Choi
(Continued)

FOREIGN PATENT DOCUMENTS

EP    2 469 721    6/2012

OTHER PUBLICATIONS

European Search Report dated Jan. 24, 2017 in counterpart European Patent Application No. 16154132.1, 12 pages.

*Primary Examiner* — Mohamed Kamara
(74) *Attorney, Agent, or Firm* — Finnegan, Henderson, Farabow, Garrett & Dunner LLP

(57) ABSTRACT

This disclosure relates generally to improving wireless data rates, and more particularly to methods and systems for dynamic CoMP-link maintenance. In one embodiment, a system may identify a default coordinated multipoint set of neighboring base stations for a user equipment associated with a serving base station. The system may detect at least one of: a change in a data rate requirement for the user equipment, and a stale coordinated multipoint link for the user equipment to one of the neighboring stations in the default coordinated multipoint set. The system may also determine, after detecting at least one of the change in the data rate requirement and the stale coordinated multipoint link, whether to perform at least one coordinated multipoint link maintenance procedure, including at least one of: a coordinated multipoint link handover, a coordinated multipoint link replacement, a coordinated multipoint link consolidation, or a coordinated multipoint scheme modification.

17 Claims, 4 Drawing Sheets

(51) Int. Cl.
*H04W 24/08* (2009.01)
*H04L 5/00* (2006.01)
*H04W 36/30* (2009.01)
*H04W 36/26* (2009.01)
*H04B 7/024* (2017.01)
*H04W 24/04* (2009.01)

(52) U.S. Cl.
CPC ........... *H04W 24/08* (2013.01); *H04W 36/26* (2013.01); *H04W 36/30* (2013.01)

(56) References Cited

U.S. PATENT DOCUMENTS

| | | | | |
|---|---|---|---|---|
| 2011/0268007 A1* | 11/2011 | Barany | ................... | H04B 7/024 370/312 |
| 2011/0281585 A1* | 11/2011 | Kwon | ................... | H04L 1/0002 455/436 |
| 2012/0165063 A1* | 6/2012 | Scalia | ................. | H04W 52/343 455/522 |
| 2017/0214436 A1* | 7/2017 | Chaudhuri | ............ | H04W 24/10 |

* cited by examiner

METHODS AND SYSTEMS FOR DYNAMIC COORDINATED MULTI POINT LINK MAINTENANCE

PRIORITY CLAIM

This U.S. patent application claims priority under 35 U.S.C. § 119 to: India Application No. 7008/CHE/2015, filed Dec. 28, 2015. The entire contents of the aforementioned application are incorporated herein by reference.

TECHNICAL FIELD

This disclosure relates generally to improving wireless data rates, and more particularly to methods and systems for dynamic coordinated multi point (CoMP) link maintenance.

BACKGROUND

The Third Generation Partnership Project (3GPP) has organized and developed long-term evolution (LTE) or "4G" standards for wireless cellular networks. As LTE protocols continue to evolve, 3GPP has introduced guidelines for coordinated multi point (CoMP) links. CoMP links may improve network performance on cell edges by establishing active back-up channels between a user equipment (UE) and a neighbor base station (NBS) and a serving base station (SBS). For example, a serving base station may select a neighbor base station from a CoMP set of base stations to establish an active back-up channel. The active back-up channel may provide additional network connectivity as a user equipment, such as a cell phone, distances itself from the serving base station at the cell edge. As the serving base station signal dissipates, the neighbor base station may provide a supplementary coordinated link.

SUMMARY

Embodiments of the present disclosure present technological improvements as solutions to one or more of the above-mentioned technical problems recognized by the inventors in conventional systems. For example, embodiments may include systems, methods, and computer-readable media for identifying, via a hardware processor, a default coordinated multipoint set of neighboring base stations for a user equipment associated with a serving base station. Disclosed embodiments may also detect, via the hardware processor, at least one of: a change in a data rate requirement for the user equipment, and a stale coordinated multipoint link for the user equipment to one of the neighboring stations in the default coordinated multipoint set. Disclosed embodiments may also determine, via the hardware processor, after detecting at least one of the change in the data rate requirement and the stale coordinated multipoint link, whether to perform at least one coordinated multipoint link maintenance procedure, including at least one of: a coordinated multipoint link handover, a coordinated multipoint link replacement, a coordinated multipoint link consolidation, or a coordinated multipoint scheme modification. Disclosed embodiments may further include initiating, via the hardware processor, the at least one determined coordinated multipoint link maintenance procedure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
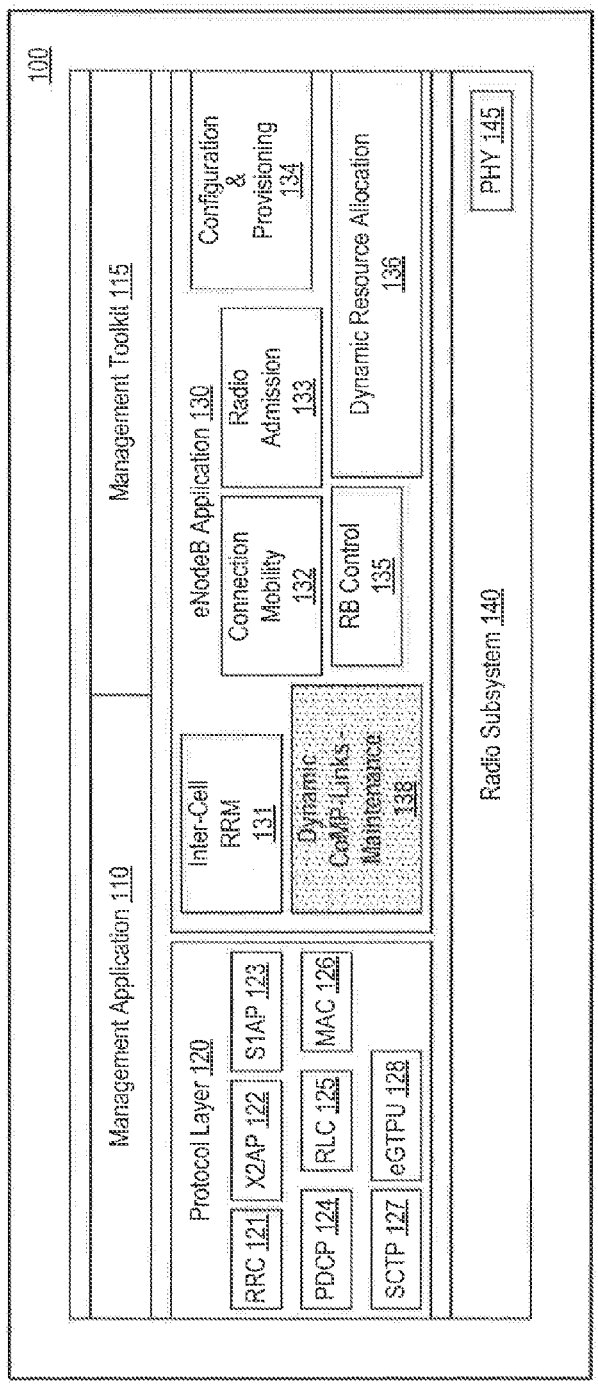
FIG. 1 illustrates an exemplary dynamic CoMP link maintenance system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

While CoMP links, as described by 3GPP specifications provide added back-up links at cellular edges, the current mechanisms do not provide for CoMP link lifecycle management. Therefore, inactive and underutilized links may create unnecessary network resource overhead. For example, existing CoMP link processes do not guarantee improved throughput when the selected CoMP scheme is not suitable in the current cycle and likely to create delays in finding a suitable CoMP scheme. Moreover, existing processes do not provide an efficient way to update CoMP schemes. Additionally, current CoMP link systems fail to identify redundant or unnecessarily duplicative CoMP links, such as from an existing set of CoMP links for termination or clean-up, which creates unnecessary overhead. Also, existing systems do not provide any mechanism to clean-up or reallocate identified unnecessary CoMP links or satisfy CoMP links that may be required to maintain network connectivity at the cell edge.

Disclosed embodiments may provide systems and methods for CoMP link maintenance. For example, disclosed embodiments may provide a maximum achievable data rate at a cell edge while keeping network overhead under an upper limit. Disclosed embodiments may provide adaptive CoMP links that are updated based on the activity and needs of user equipment over time, including terminating unsuitable links and creating additional suitable links to achieve desired data rates. Disclose embodiments may also provide an adaptive CoMP link scheme selection mechanism. For example, disclosed systems and methods may determine or identify an appropriate CoMP link scheme to achieve desired network data rates and overhead limits.

Additionally, disclosed embodiments may provide mechanisms and processes to consolidate CoMP links to reduce user equipment overhead. For example, disclosed embodiments may detect a changed data-rate requirement (e.g., terminated guaranteed bit rate (GBR) service or lowered data-rate), a stale CoMP link (e.g., an inactive CoMP link or a link with a lower UE buffer), and/or a degraded channel (e.g., a link radio failure, low signal-to-noise ratio, and the like). Based on these detected aspects of the CoMP links in a system, disclosed embodiments may modify existing CoMP links to provide higher bit rates and lower overhead.

FIG. 1 illustrates an exemplary dynamic CoMP link architecture 100 according to some embodiments of the present disclosure. Architecture 100 may provide various components to enable dynamic CoMP link maintenance at, for example, an eNodeB.

Architecture 100 may include radio subsystem 140 for physical transmission. For example, radio subsystem 140 may include physical layer 145. Physical layer 145 may be used for communication with UEs. In some embodiments, physical layer 145 may include functionality such as OFDM modulation and coding, resource partitioning, and multiplexing.

Architecture 100 may include protocol layer engine 120. In some embodiments, protocol layer engine 120 may include user plane protocols. For example, protocol layer engine 120 may be responsible for handling and control of user plane protocol messages, such as Packet Data Convergence Protocol (PDCP 124), Radio Link Control (RLC 125), and Medium Access Control (MAC 126), based on current state of the engine. These protocols may facilitate header compression and encryption of user level IP packets, error recovery and flow control, hybrid automatic repeat request (HARQ), and scheduling.

In some embodiments, protocol layer engine 120 may include higher level control layer protocols. For example, protocol layer engine 120 may be responsible for handling control plane protocols, such as Radio Resource Control (RRC 121) and S1 Application Part (S1AP 123), as well as user plane protocols, such as evolved GPRS Tunneling Protocol-User data tunneling (eGTP-U 128) messages based on the current state of the engine. These protocols may facilitate session management, security, radio management, and mobility management. For example, RRC 121 may provide connection establishment and connection release, system information broadcast, bearer establishment, and reconfiguration. RRC 121 may also handle RRC mobility procedures, paging notification, and release and outer loop power control.

In some embodiments, protocol layer engine 120 may include specific components to handle the X2 Application Protocol (X2AP 122), X2AP 122 may be used to handle the UE mobility. For example, X2AP 122 may provide functionality such as mobility management during handover, load management for load balancing, resetting the X2 in the event of failure of system, and setting up the X2 for information transfer among base stations. X2AP 122 may also facility eNodeB configuration updates for updating the changes in the configuration.

In some embodiments, protocol layer engine 120 may include transport layer protocols. For example, protocol layer engine 120 may include components to handle Stream Control Transmission Protocol (SCTP 127) to provide in-sequence message transport.

Architecture 100 may include improved eNodeB application 130. eNodeB application 130 may provide node management functions. In some embodiments, eNodeB may include standard functionality, for example using connection mobility 132, radio admission 133, configuration and provisioning 134, radio broadcast control 135, and dynamic resource allocation 136.

In some embodiments, improved eNodeB application 130 may include components to support radio resource management (inter-cell RRM 131). RRM 131 may function as a subset of RRC to manage RRC resources. RRM 131 may perform the necessary measurements configuration for measurement report. RRM 131 also process the measurement report received via RRC 121.

eNodeB application 130 may include dynamic CoMP link maintenance processor 138. Dynamic CoMP link maintenance processor 138 may be introduced inside eNodeB application 130. Dynamic CoMP link maintenance processor 138 may receive CoMP Link related configuration information from Management Application 110 that is gathered and forwarded by eNodeB application 130 during startup of the system. Dynamic CoMP link maintenance processor 138, which is part of eNodeB application 130, may obtain the necessary configuration data and load it into its own persistent memory (e.g., DCLM-PM) for local configuration (LC). Dynamic CoMP link maintenance processor 138 may extract configuration information of neighbor base stations. For example, dynamic CoMP link maintenance processor 138 may extract default CoMP set creation by accessing its DCLM-PM, Dynamic CoMP link maintenance processor 138 may determine, based on the default CoMP set, links to be used for providing service to a UE at a cell edge. Based on the service, Dynamic CoMP link maintenance processor 138 may update configuration information in DCLM-PM. The updated configuration information may be sent by dynamic CoMP link maintenance processor 138 to eNodeB application 130.

Architecture 100 may include management application 110, which will be further discussed in related to FIG. 2 below. Management application 110 may interact with and receive services from management toolkit 115 as shown in FIG. 1.

As discussed above, architecture 100 may include some existing LTE architecture elements. Though, architecture 100 may include additional components that use existing LTE components in new ways.

Figure 2:
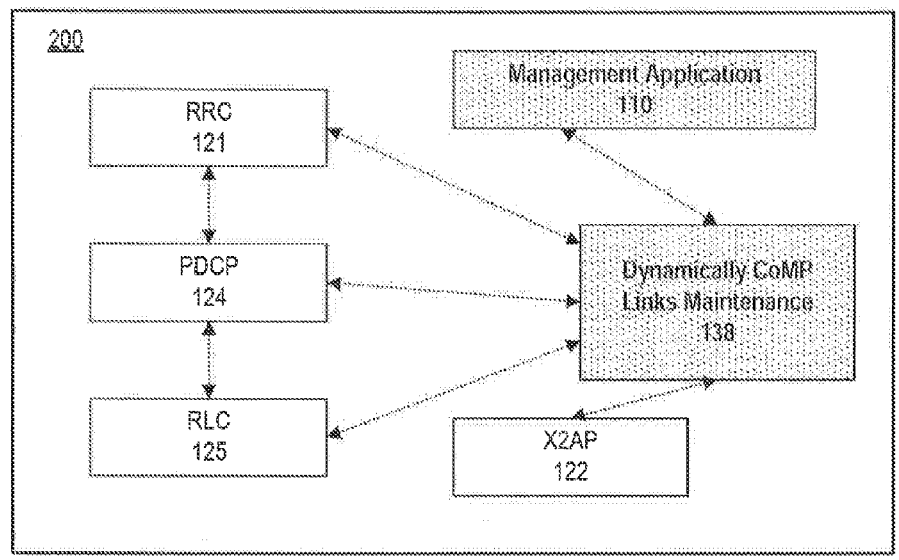
FIG. 2 is a functional block diagram according to some embodiments of the present disclosure.

FIG. 2 is a functional block diagram of system 200 according to some embodiments of the present disclosure. System 200 illustrates how dynamic CoMP link maintenance processor 138 may interact with various components of architecture 100. For example, dynamic CoMP link maintenance processor 138 may predominantly interact with RLC 125, RRC 121, PDCP 124, X2AP 122, and management application 110. These interaction may be facilitated by eNodeB application 130 and/or management interface. Using these resources, dynamic CoMP link maintenance processor 138 may provide a mechanism to maintain CoMP links resulting in seamless service to a UE in a serving base station cell coverage area by multiple neighbor cells.

In an embodiment, dynamic CoMP link maintenance processor 138 may be responsible for maintaining an existing CoMP set (e.g., a CoMP link rearrangement, CoMP scheme rearrangement, tearing down a CoMP link, achieving required maximum achievable data rate (MADR)) for a UE in serving base station cell. dynamic CoMP link maintenance processor 138 may work with RRM 131, RRC 121, and X2AP 122 to maintain a CoMP set at eNodeB application 130. For initial configuration, dynamic CoMP link maintenance processor 138 may send a message through a configuration API to obtain global configuration parameters from management application 110 through a control process of eNodeB application 130.

Dynamic CoMP link maintenance processor 138 may hold all the configuration related parameters in a local configuration. For example, the local configuration may store a MADR lower threshold (COMP-Madr$_{th}$), a threshold signal strength (Signal$_{th}$), threshold HARQ (HARQ$_{th}$), a threshold CSI (CSI$_{th}$) in persistent memory (e.g., DCLM-PM).

In an embodiment, an exemplary local configuration (LC) may include a maximum achievable data rate threshold (AchievableDataRateCoMPLink$_{Max}$). This threshold may serve as a dynamically varying threshold value for maximum achievable data rate which based on changes in UE requirements. A serving base station may use this threshold parameter as a part of a CoMP Link Change Assessment (CLCA).

In an embodiment, an exemplary local configuration (LC) may include a list of default CoMP Links (CoMPLink$_{Default}$). The default list may recite CoMP links received from management application 110 during system Initialization. eNodeB application 130 of a serving base station may utilize the default list to establish CoMP links with the neighbor base station. This parameter may also be used by a CoMP Link Change Assessment (CLCA) in a serving base station.

In an embodiment, an exemplary local configuration (LC) may include a threshold radio link failure factor (RlfRateCompLink$_{Threshold}$). The failure factor may be used to select the neighboring base station to maintain a CoMP link. A higher radio link failure factor may reduce the likelihood of selecting a cell in a corresponding base station. This parameter may also be used by a CoMP Link Change Assessment (CLCA) in a serving base station.

In an embodiment, an exemplary local configuration (LC) may include a CoMP link assessment timer (CoMPLinkAssesment$_{Timer}$) The timer may be used to assess a CoMP link. For example, the timer may be used to determine if a particular CoMP link is providing desired data rate to a UE. This parameter may also be used by a CoMP Link Change Assessment (CLCA) in a serving base station.

In an embodiment, an exemplary local configuration (LC) may include a threshold UE buffer status (UeBuffStatus$_{Threshold}$). This threshold may indicate a limit on the buffer capacity of UE when considering the UE to take service from neighbor of CoMP set. For example when a UE buffer status exceeds the threshold, a neighbor base station may be sought to relieve network congestion. This threshold may be used in the Detection of Link Consolidation Conditions (DLCC).

In an embodiment, an exemplary local configuration (LC) may include a CoMP link stale timer (CoMPLinkStale$_{timer}$). This stale time may be a threshold timer to identify inactive CoMP links. For example, if the link is inactive for the predefined Stale Timer limit, dynamic CoMP link maintenance processor 138 may consider terminating the link. This timer may be used in the Detection of Link Consolidation Conditions (DLCC).

In an embodiment, an exemplary local configuration (LC) may include a threshold handover value (CoMPLinkAssestrientVairieHO$_{Threshold}$) This threshold value may be used for determining handover criteria to pass a UE to a NBS. For example, when the handover threshold is exceeded, dynamic CoMP link maintenance processor 138 may initiate handover. This parameter may be used by a CoMP Link Change Assessment (CLCA).

In an embodiment, an exemplary local configuration (LC) may include a threshold link replacement value (CoMPLinkAssesmentValueCLR$_{Threshold}$). This threshold may be used for determining CoMP link replacement criteria for a UE to NBS. For example, when the threshold is exceeded, dynamic CoMP link maintenance processor 138 may replace the link. Also, this threshold may be used by a CoMP Link Change Assessment (CLCA).

In an embodiment, an exemplary local configuration (LC) may include a threshold CoMP scheme value (CoMPLinkAssesmentValueaSM$_{Threshold}$). This threshold may be used for determining CoMP scheme criteria for a UE to NBS. For example, when the threshold is exceeded, dynamic CoMP link maintenance processor 138 may alter or update the CoMP scheme. This parameter may be used by a CoMP Link Change Assessment (CLCA).

In an embodiment, an exemplary local configuration (LC) may include a threshold channel state indication (CSI) (CoMPLinkCsiValue$_{Threshold}$). This threshold indicates a baseline indication for determining whether a NBS should be considered for purposes of CoMP link establishment and maintenance. For example, if the CSI is below the threshold factor then the NBS may not be considered for CoMP link maintenance. This parameter may be used in the Detection of Link Consolidation Conditions (DLCC).

This list of exemplary local configuration parameters is not exhaustive and in no way is meant to be limiting. In some embodiments, other logical configuration parameters may be used.

System 200 may include management application 110. Management application 110 may initially configure system 200 during start-up of the system. Management application 110 may also locally store configuration data in its own persistent memory. In some embodiments, management application 110 may provide the configuration data to dynamic CoMP link maintenance processor 138 for configuration, in addition to providing the data other processors, such as RRC 121, X2AP 122, PDCP 124, and S1AP 123, Management application 110 may update configuration information received from dynamic CoMP link maintenance processor 138 and other components in its own persistent memory and send updated dynamic CoMP link maintenance configuration data for storage. In some embodiments, management application 110 may receive global information for configuring global data specific to a base station during start-up of the system. Management application 110 configure a base station during start-up using the global specific data.

Management application 110 may contain the following data for configuration:

DCLM$_{Config}$: Dynamic CoMP link maintenance (DCLM) configuration data may be used to configure DCLM module. The configuration data may include, for example:
Maximum Achievable Data Rate threshold (AchievableDataRateCoMPLink$_{Max}$)
Default CoMP Links List (CoMPLink$_{Default}$)
Threshold Radio Link Failure Factor (RlfRateCompLink$_{Threshold}$)
CoMP Link assessment timer (CoMPLinkAssesment$_{Timer}$)
Threshold UE Buffer Status (UeBuffStatus$_{Threshold}$)
CoMP link Stale Timer (CoMPLinkStale$_{timer}$)
Threshold Handover Value (CoMPLinkAssesmentValueHO$_{Threshold}$)
Threshold Link Replacement Value (CoMPLinkAssesmentValueCLR$_{Threshold}$)

Threshold CoMP Scheme Value (CoMPLinkAssestnent-ValueCSM$_{Threshold}$)

Threshold CSI (CoMPLinkCsiValue$_{Threshold}$)

RRC$_{Config}$: RRC configuration data may be used to configure RRC module. The RRC configuration data may include:

AntennaInfo
CQI-ReportConfig
LogicalChannelConfig
MAC-MainConfig
PDCP-Config
and the like.

RRM$_{Config}$: RRM Configuration data may be used to configure RRM module. The RRM configuration data may include Measurement Configuration, PDCP$_{Config}$: PDCP configuration data may be used to configure PDCP module.

X2AP$_{Config}$: X2AP configuration data may be used to configure X2AP module.

BS$_{Config}$: Base station configuration data may be used to configure Base Station, such as BS transmission power, BS cell identifier, and BS location.

Figure 3:
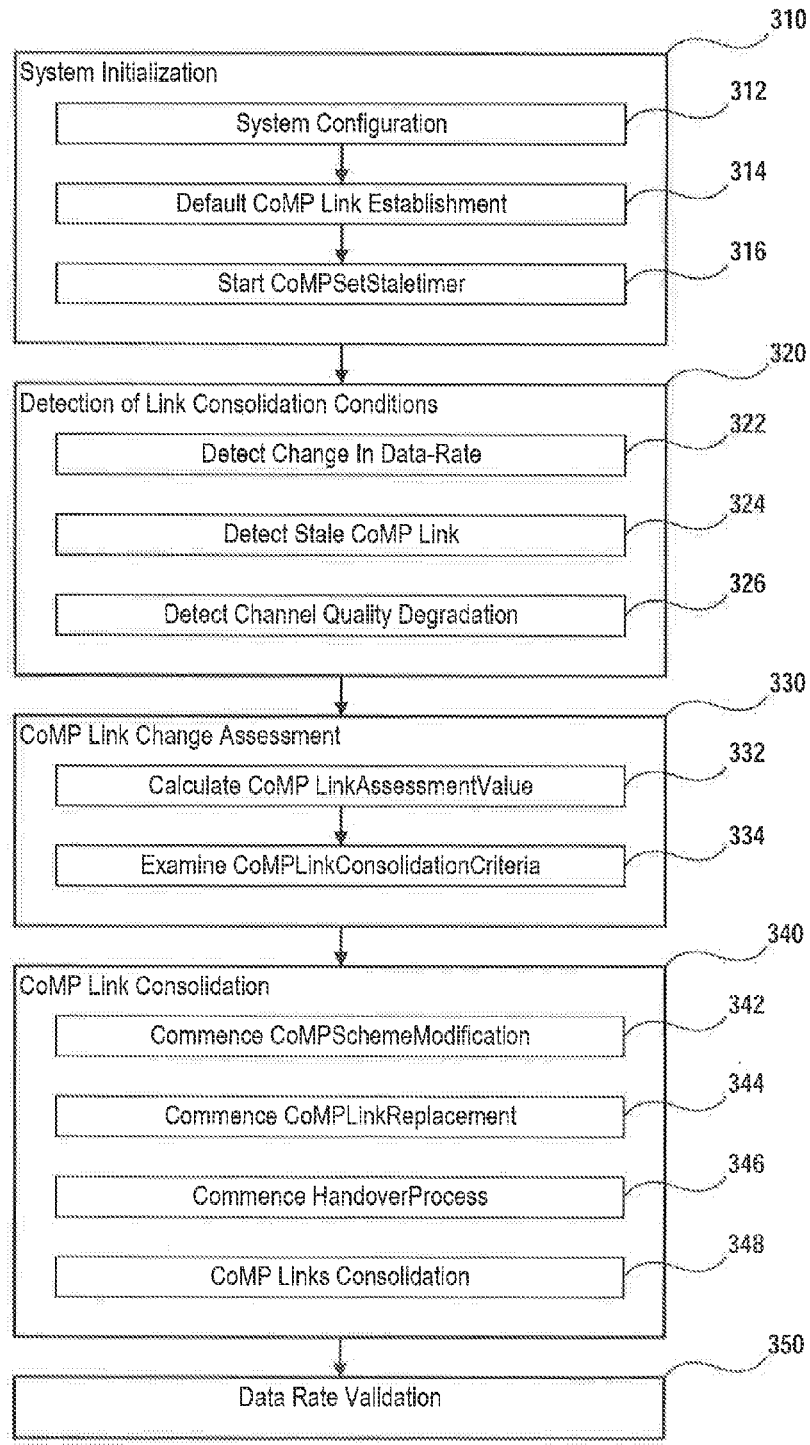
FIG. 3 is a flow diagram illustrating an exemplary dynamic CoMP link maintenance process in accordance with some embodiments of the present disclosure.

FIG. 3 is a flow diagram illustrating an exemplary dynamic CoMP link maintenance process 300 in accordance with some embodiments of the present disclosure. Process 300 may include process steps that actively maintain a CoMP set to achieve maximum data rates. While the steps of process 300 are shown and discussed in a particular order, the steps may be combined or reordered without limit, consistent with the disclosure.

In step 310, system 200 may perform system initialization. In some embodiments, step 310 may include system configuration (step 312), default CoMP link establishment (step 314), and/or starting the stale CoMP link timer (step 316). In step 312, system 200 may perform configuration processes. In some embodiments dynamic CoMP link maintenance processor 138 may receive configuration information of Base Stations (BSs) from Management Application 110 through a communication interface or in-memory data sharing. dynamic CoMP link maintenance processor 138 may configure the necessary measurement parameters for receiving UE measurement report of neighbor base station in each sector of a serving base station network. Dynamic CoMP link maintenance processor 138 may load a copy of a LC from the persistent store DCLM-PM to its memory as an LC copy in memory (LCM).

In step 314, system 200 may establish default CoMP links. For each entry in the default CoMP link list, dynamic CoMP link maintenance processor 138 may establish CoMP links with between a UE and a NBS. This step may be repeated by dynamic CoMP link maintenance processor 138 for each entry until every entry on the default CoMP link list is processed.

In step 316, system 200 may start a staleness timer for CoMP links. In some embodiments, dynamic CoMP link maintenance processor 138 may start CoMPLinkStale$_{timer}$ to detect CoMP link consolidation.

In step 320, system 200 may detect link consolidation conditions. In some embodiments, detection of link consolidation conditions (DLCC) may receive measurement metrics (e.g. current data rate on a CoMP link, change in required data rate for a UE, channel quality of a CoMP link, current UE data buffer, and the like) from different protocol layers of architecture 100. Based on the metrics, system 200 may determine if consolidation should occur. For example, step 320 may include detecting changes in the data rate (step 322), detecting stale CoMP links (step 324), and/or detecting degrading channel quality (step 326).

In step 322, system 200 may detect a change in a data rate requirement. In some embodiments, system 200 may obtain the number of GBR services currently active (NumGbrSeivices$_{Curr}$) for a UE and/or the number of GBR services previously active (NumGbrServices$_{Prev}$) for the UE. Based on the current and/or previously active services, system 200 may update the change data rate requirement. For example, when the current number of active services is less than the previous number of active services (e.g., If NumGbrServices$_{Curr}$<NumGbrServices$_{Prev}$), then system 200 may set a change data rate flag to true (e.g., ChangeInUeDataRate$_{Requirement}$=TRUE).

In some embodiments, system 200 may obtain a maximum achievable data rate on a CoMP link (e.g., AchievableDataRateCoMPLink$_{Max}$) and/or a current actual data rate that is being served by the CoMP link (ActualDataRateCoMPLink$_{Curr}$). Using the two data rates, system 200 may calculate a current usage of a CoMP Link based on a ratio of the actual data rate to the achievable data rate. For example, the usage may be calculated as a percentage:

$$\text{CoMPLinkUsage}_{Curr}=(\text{ActualDataRate CoMPLink}_{Curr}/\text{AchievableDataRate CoMPLink}_{Max})*100$$

In some embodiments, system 200 may obtain previous actual data rate that was being served by the CoMP link (ActualDataRateCoMPLink$_{Prev}$) and calculate the previous CoMP link usage using the formula:

$$\text{CoMPLinkUsage}_{Prev}=(\text{ActualDataRate CoMPLink}_{Prev}/\text{AchievableDataRate CoMPLink}_{Max})*100$$

System 200 may obtain may indicate that there is a change in a UE data rate requirement when the difference between the current CoMP link usage and the previous CoMP link usage is less than a usage threshold. For example, when the following equation is true, system 200 may set the ChangeInUeDataRate$_{Requirement}$ flag to "TRUE":

$$\text{CoMPLinkUsage}_{Curr}-\text{CoMPLinkUsage}_{Prev}<=\text{CoMPLinkUsage}_{Threshold},$$

In step 324, system 200 may detect stale CoMP links. In some embodiments, when CoMPLinkStale$_{timer}$ has expired, then system 200 may set the flag CoMPLinkStale to be "TRUE". In some embodiments, system 200 may obtain the average UE buffer status of a service provided through a CoMP link (e.g., UeBufferStatusCompLink$_{Avg}$). When the avenge CoMP link buffer status is less than or equal to the UE buffer status threshold (e.g., UeBuffStatus$_{Threshold}$), system 200 may set the flag CoMPLinkStale to "TRUE".

In step 326, system 200 may detect channel quality degradation. In some embodiments, system 200 may obtain a radio link failure rate at a lower layer (e.g., RlfRateCompLink) for a CoMP link. When the failure rate at the lower level is less than or equal to a corresponding threshold (e.g., RlfRateCompLink$_{Threshold}$), system 200 may set the flag CoMPLinkChQualityDegrade to "TRUE". In some embodiments, system 200 may calculate Channel State Information (CSI) of the CoMP link using a standard method (e.g., to determine CoMPLinkCsiValue). When the CSI value is less than or equal to a corresponding threshold (e.g., CoMPLinkCsiValue$_{Threshold}$), system 200 may set the flag CoMPLinkChQualityDegrade to "TRUE".

In step 330, system 200 may assess CoMP link changes. In some embodiments, system 200 may perform a CoMP Link Change Assessment (CLCA). For example, system 200 may calculate a CoMPLinksAssesmentValue parameter for each CoMP link activated for a UE. In some embodiments, step 330 may include calculating CoMP link assessment values (step 332) and/or examining CoMP link consolidation criteria (step 334).

In step 332, system 200 may calculate the CoMPLinksAssessmentValue. For example, system 200 may obtain the number of TRUE ChangeInUeDataRateRequirement flags (e.g., $\text{Num}_{ChangeInUeDataRateRequirement}$) for a CoMP link for a given period of time (e.g., the time of $\text{CoMPLinkAssesment}_{Timer}$). System 200 may also obtain a number of TRUE CoMPLinkStale flags (e.g., $\text{Num}_{CoMPLinkStale}$) for a CoMP link for a period of time (e.g., the time of $\text{CoMPLinkAssesment}_{Timer}$), as well as the number of TRUE CoMPLinkChQualityDegrade flags (e.g., $\text{Num}_{CoMPLinkChQualityDegrade}$) for a period of time (e.g., the time of $\text{CoMPLinkAssesment}_{Timer}$).

In some embodiments, system 200 may calculate a handover process initiation assessment value, for example, using the formula:

$$\text{CoMPLinkAssesmentValue}_{HO} = \\ (\text{Num}_{ChangeInUeDataRateRequirement} * \text{OffSet}_{ChangeInUeDataRateRequirement}) + \\ (\text{Num}_{CoMPLinkStale} * \text{OffSet}_{CoMPLinkStale}) + \\ (\text{Num}_{CoMPLinkChQualityDegrade} * \text{OffSet}_{CoMPLinkChQualityDegrade})$$

System 200 may also calculate a CoMP Link replacement assessment value using the formula:

$$\text{CoMPLinkAssesmentValue}_{CLR} = \\ (\text{Num}_{ChangeInUeDataRateRequirement} * \text{OffSet}_{ChangeInUeDataRateRequirement}) + \\ (\text{Num}_{CoMPLinkStale} * \text{OffSet}_{CoMPLinkStale})$$

In some embodiments, system 200 may calculate the CoMP Scheme modification assessment value as follows:

$$\text{CoMPLinkAssesmentValue}_{CSM} = \\ (\text{Num}_{ChangeInUeDataRateRequirement} * \text{OffSet}_{ChangeInUeDataRateRequirement}) + \text{Fn}(\text{CoMPLinkAssesmentValue}_{HO}, \text{CoMPLinkAssesmentValue}_{CLR})$$

(where Fn is a function for deciding CoMP scheme assessment)

In step 334, system 200 may examine CoMPLinksConsolidationCriteria. In some embodiments, when the CoMP link assessment value CoMPLinkAssessmentValueHO is greater than the corresponding threshold (e.g., $\text{CoMPLinkAssesmentValueHO}_{Threshold}$), then system 200 may set the flag $\text{HOAssessed}_{Flag}$ to be "TRUE" for the instant CoMP Link. When the CoMP link assessment value CoMPLinkAssessmentValueCLR is greater than the corresponding threshold (e.g., $\text{CoMPLinkAssesmentValueCLR}_{Threshold}$), then system 200 may set the flag $\text{CLRAssessed}_{Flag}$ to be "TRUE" for the instant CoMP Link. Further, when the CoMP link assessment value CoMPLinkAssessmentValueCSM is greater than the corresponding threshold (e.g., $\text{CoMPLinkAssesmentValueCSM}_{Threshold}$), then system 200 may set the flag $\text{CSMAssessed}_{Flag}$ to be "TRUE" for the instant CoMP Link.

In step 340, system 200 may consolidate CoMP links. System may utilize CoMP Link Consolidation (CLC). For example, CLC may decide whether an existing CoMP link shah be terminated for replacing with new CoMP link. In some embodiments, step 340 may include commencing CoMP scheme modifications (step 342), commencing CoMP link replacement (step 344), commencing a link handover (step 246), and/or consolidating CoMP links (step 348).

In step 342, system 200 may being CoMP scheme modifications (e.g., coordinated multipoint scheme modification, labeled as CoMPSchemeModification). For each CoMP link in the default CoMP link list (e.g., $\text{CoMPLink}_{Default}$), system 200 may determine whether the link is for CoMPSchemeModification. When the determination is TRUE, system 200 may calculate a $\text{Totallink}_{scheme}$ variable and repeat the step for each link.

In step 344, system 200 may begin replacing CoMP links (e.g., coordinated multipoint link replacement, labeled as CoMPLinkReplacement). For each CoMP link in the default CoMP link list (e.g., $\text{CoMPLink}_{Default}$), system 200 may determine whether the link is for CoMPLinkRepiacement. When the determination is TRUE, system 200 may calculate a $\text{Totallink}_{replace}$ variable and repeat the step for each link.

In step 346, system 200 may commence a handover process (e.g., coordinated multipoint link handover, labeled as HandoverProcess). For each CoMP link in the default CoMP link list (e.g., $\text{CoMPLink}_{Default}$), system 342200 may determine whether the link is for CoMPHandoverProcess. When the determination is TRUE, system 200 may calculate a $\text{Totallink}_{handover}$ variable and repeat the step for each link.

In step 348, system 200 may consolidate links (e.g., multipoint scheme modification). Based on the previously calculated variables, system 200 may apply a new CoMP scheme on all links, establish new links for the replaced links and/or initiate a handover process. For example, When $\text{Totallink}_{scheme}$ (e.g., from step 342) is greater than half of $\text{CoMPL}_{exsrt}$, system 200 may apply a new CoMP scheme on all links. Based on $\text{Totallink}_{replace}$ (e.g., from step 344), system 200 may establish new links for the replaced links. Also, using $\text{Totallink}_{handover}$ (e.g., from step 346), system 200 may initiates handover process. For example for each link that fails the threshold, system 200 may handover the link. In other embodiments, when the handover count exceeds a predetermined threshold, a predetermined number of links may be processed in a handover.

In step 350, system 200 may validate data rates after changes to the CoMP link arrangement. After successful consolidation of CoMP links, system 200 may calculate a data rate provided by new CoMP links for a UE. System 200 may check whether the determined data rate is above or below Maximum Achievable Data Rate threshold (e.g, $\text{AchievableDataRateCoMPLink}_{Max}$). For example, for each CoMP link in the new CoMP link list (e.g., $\text{NCoMPLnk}_{List}$), system 200 may determine data rate for each link (e.g., $DR_{ith}$), determine total data rate (e.g., $DR_{total} = \Sigma_{i=1}^{CoMPLnkList} DR_{ith}$). Based on the calculations, system 200 may determine if the total data rate is greater than the maximum achievable rate (e.g., $DR_{Total} >= \text{AchievableDataRateCoMPLink}_{Max}$). When true, system 200 may consider whether the new CoMP links are appropriate, otherwise new CoMP links may be determined in the next triggered event. The step is repeated for each CoMP link in the new list. After determination of $\text{NCoMPLnk}_{List}$ the list is sent to management application 110 for updating in CoMP list.

Figure 4:
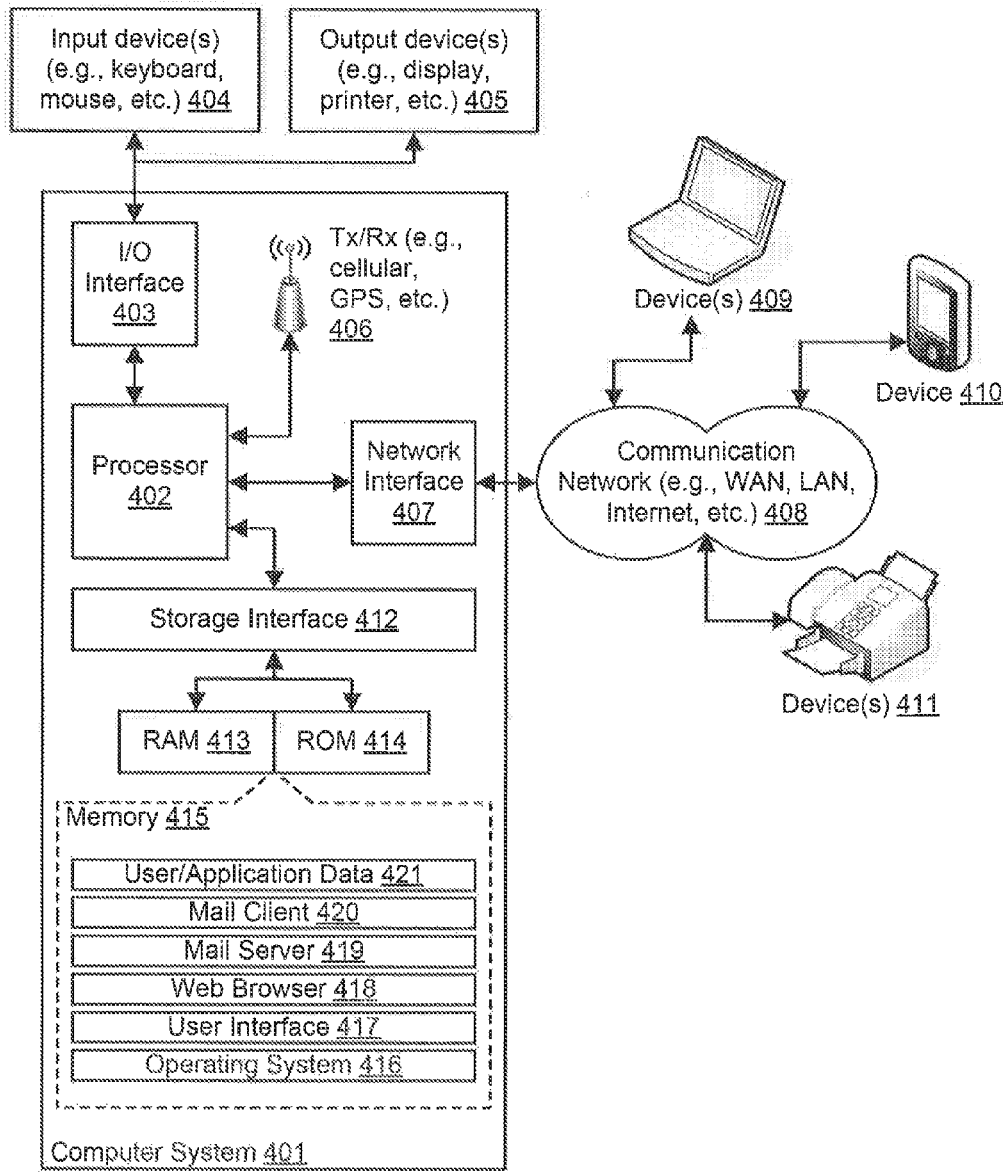
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the devices and systems disclosed herein. Computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM'S application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (COMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 416, user interface 417, web browser 418, mail server 419, mail client 420, user/application data 421 (e.g., any data variables or data records discussed in this disclosure, such as the CoMP link lists or associate variables), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, strollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Rash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mall transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described methods and systems for dynamic CoMP-link maintenance. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier ayes and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A dynamic coordinated multipoint link maintenance system, comprising:
   a hardware processor; and
   a memory storing instructions executable by the hardware processor for:
   identifying, via the hardware processor, a default coordinated multipoint set of neighboring base stations for a user equipment associated with a serving base station;
   detecting, via the hardware processor, at least one of: a change in a data rate requirement for the user equipment, and a stale coordinated multipoint link for the user equipment to one of the neighboring stations in the default coordinated multipoint set, wherein detecting the change in the data rate requirement for the user equipment comprises determining whether a current usage for a coordinated multipoint link to one of the neighboring base stations in the default coordinated multipoint set differs from a previous usage for the coordinated multipoint link by an amount greater than a threshold value;
   determining, via the hardware processor, after detecting at least one of the change in the data rate requirement and the stale coordinated multipoint link, whether to perform at least one coordinated multipoint link maintenance procedure, including at least one of:
   a coordinated multipoint link handover,
   a coordinated multipoint link replacement,
   a coordinated multipoint link consolidation, or
   a coordinated multipoint scheme modification; and
   initiating, via the hardware processor, the at least one determined coordinated multipoint link maintenance procedure.

2. The system of claim 1, wherein detecting, via the hardware processor, a change in a data rate requirement for the user equipment comprises:
   determining, via the hardware processor, whether a number of currently active guaranteed bit-rate services for the user equipment is less than a number of previously active guaranteed bit-rate services for the user equipment.

3. The system of claim 1, wherein detecting, via the hardware processor, a stale coordinated multipoint link for the user equipment to one of the neighboring stations in the default coordinated multipoint set comprises:
   determining, via the hardware processor, whether a coordinated multipoint link to one of the neighboring base stations in the default coordinated multipoint set has been inactive for greater than a threshold timer value.

4. The system of claim 1, wherein detecting, via the hardware processor, a stale coordinated multipoint link for the user equipment to one of the neighboring stations in the default coordinated multipoint set comprises:
   determining, via the hardware processor, whether a channel quality for a coordinated multipoint link to one of the neighboring base stations in the default coordinated multipoint set has reduced by greater than a threshold quality value.

5. The system of claim 1, the memory further storing instructions for:
   calculating, via the hardware processor, a data rate for the user equipment;
   determining, via the hardware processor, that the calculated data rate for the user equipment does not exceed a data rate threshold; and initiating, via the hardware processor, at least one additional coordinated multipoint link maintenance procedure.

6. The system of claim 1, the memory further storing instructions for:
generating, via the hardware processor, at least one updated default coordinated multipoint set of neighboring base stations for the user equipment, after determining whether to perform at least one coordinated multipoint link maintenance procedure.

7. A method for dynamic coordinated multipoint link maintenance, comprising:
identifying, via a hardware processor, a default coordinated multipoint set of neighboring base stations for a user equipment associated with a serving base station;
detecting, via the hardware processor, at least one of: a change in a data rate requirement for the user equipment, and a stale coordinated multipoint link for the user equipment to one of the neighboring stations in the default coordinated multipoint set, wherein detecting the change in the data rate requirement for the user equipment comprises determining whether a current usage for a coordinated multipoint link to one of the neighboring base stations in the default coordinated multipoint set differs from a previous usage for the coordinated multipoint link by an amount greater than a threshold value;
determining, via the hardware processor, after detecting at least one of the change in the data rate requirement and the stale coordinated multipoint link, whether to perform at least one coordinated multipoint link maintenance procedure, including at least one of:
a coordinated multipoint link handover,
a coordinated multipoint link replacement,
a coordinated multipoint link consolidation, or
a coordinated multipoint scheme modification; and
initiating; via the hardware processor, the at least one determined coordinated multipoint link maintenance procedure.

8. The method of claim 7, wherein detecting, via the hardware processor, a change in a data rate requirement for the user equipment comprises:
determining, via the hardware processor, whether a number of currently active guaranteed bit-rate services for the user equipment is less than a number of previously active guaranteed bit-rate services for the user equipment.

9. The method of claim 7, wherein detecting, via the hardware processor, a stale coordinated multipoint link for the user equipment to one of the neighboring stations in the default coordinated multipoint set comprises:
determining, via the hardware processor, whether a coordinated multipoint link to one of the neighboring base stations in the default coordinated multipoint set has been inactive for greater than a threshold timer value.

10. The method of claim 7, wherein detecting, via the hardware processor, a stale coordinated multipoint link for the user equipment to one of the neighboring stations in the default coordinated multipoint set comprises:
determining, via the hardware processor, whether a channel quality for a coordinated multipoint link to one of the neighboring base stations in the default coordinated multipoint set has reduced by greater than a threshold quality value.

11. The method of claim 7, the memory further storing instructions for:

calculating, via the hardware processor, a data rate for the user equipment;
determining, via the hardware processor, that the calculated data rate for the user equipment does not exceed a data rate threshold; and
initiating, via the hardware processor, at least one additional coordinated multipoint link maintenance procedure.

12. The method of claim 7, the memory further storing instructions for: generating, via the hardware processor, at least one updated default coordinated multipoint set of neighboring base stations for the user equipment, after determining whether to perform at least one coordinated multipoint link maintenance procedure.

13. A non-transitory computer-readable medium storing instructions that, when executed by a hardware processor, cause the hardware processor to perform a method comprising:
identifying, via the hardware processor, a default coordinated multipoint set of neighboring base stations for a user equipment associated with a serving base station;
detecting, via the hardware processor, at least one of: a change in a data rate requirement for the user equipment, and a stale coordinated multipoint link for the user equipment to one of the neighboring stations in the default coordinated multipoint set, wherein detecting the change in the data rate requirement for the user equipment comprises determining whether a current usage for a coordinated multipoint link to one of the neighboring base stations in the default coordinated multipoint set differs from a previous usage for the coordinated multipoint link by an amount greater than a threshold value;
determining, via the hardware processor, after detecting at least one of the change in the data rate requirement and the stale coordinated multipoint link whether to perform at least one coordinated multipoint link maintenance procedure, including at least one of:
a coordinated multipoint link handover,
a coordinated multipoint link replacement,
a coordinated multipoint link consolidation, or
a coordinated multipoint scheme modification; and
initiating, via the hardware processor, the at least one determined coordinated multipoint link maintenance procedure.

14. The non-transitory computer-readable medium of claim 13, wherein detecting, via the hardware processor, a change in a data rate requirement for the user equipment comprises:
determining, via the hardware processor, whether a number of currently active guaranteed bit-rate services for the user equipment is less than a number of previously active guaranteed bit-rate services for the user equipment.

15. The non-transitory computer-readable medium of claim 13, wherein detecting, via the hardware processor, a stale coordinated multipoint link for the user equipment to one of the neighboring stations in the default coordinated multipoint set comprises:
determining, via the hardware processor, whether a coordinated multipoint link to one of the neighboring base stations in the default coordinated multipoint set has been inactive for greater than a threshold timer value.

16. The non-transitory computer-readable medium of claim 13, wherein detecting, via the hardware processor, a stale coordinated multipoint link for the user equipment to one of the neighboring stations in the default coordinated multipoint set comprises:
- determining, via the hardware processor, whether a channel quality for a coordinated multipoint link to one of the neighboring base stations in the default coordinated multipoint set has reduced by greater than a threshold quality value.

17. The non-transitory computer-readable medium of claim 13, the memory further storing instructions for:
- calculating, via the hardware processor, a data rate for the user equipment;
- determining, via the hardware processor, that the calculated data rate for the user equipment does not exceed a data rate threshold; and
- initiating, via the hardware processor, at least one additional coordinated multipoint link maintenance procedure.

* * * * *